UNITED STATES PATENT OFFICE.

ARTHUR KNÖPFLMACHER, OF VIENNA, AUSTRIA, ASSIGNOR, BY MESNE ASSIGNMENTS, TO THE CHEMICAL FOUNDATION, INC., A CORPORATION OF DELAWARE.

PROCESS FOR PRODUCING A HIGHLY-ACTIVE DECOLORIZING-CHARCOAL.

1,358,162.  Specification of Letters Patent.  Patented Nov. 9, 1920.

No Drawing.  Application filed November 9, 1916. Serial No. 130,437.

*To all whom it may concern:*

Be it known that I, ARTHUR KNÖPFLMACHER, merchant, a subject of the Emperor of Austria, residing at Vienna, in the Empire of Austria, have invented certain new and useful Improvements in Processes for Producing a Highly-Active Decolorizing-Charcoal, of which the following is a specification.

This invention relates to a process for producing an inexpensive decolorizing charcoal of particularly high decolorizing power. Bussy (cf. *Journal de Pharmacie*, vol. 8, p. 257) was the first to show that on heating nitrogenous products together with alkalis, there is formed a charcoal possessing a high degree of adsorption; and he attributed this property to the formation of the cyanid of the alkali through the interaction of the alkali with the nitrogen and carbon of the substance employed. (Cf. also Glassner & Suida, "*Jahresbericht für Chemie*", for 1893, p. 392). Nitrogenous materials, such as blood, meat, horn and the like, and molasses, together with alkalis, constitute at the present time the raw materials utilized for the manufacture of highly active decolorizing charcoal.

In spite of the valuable properties of the highly active decolorizing charcoal of the kind specified, the products thus obtained have not been generally employed as decolorizing agents on a large scale in consequence of their expensiveness, which is due to the fact that the yield obtained in carrying out the process in question is very small (from six to ten per cent. of the primary material) and also because the nitrogenous substances, or such as contain carbohydrates, being highly prized as fodder or manure, may be more economically employed for agricultural purposes.

The attempt has been made to substitute the said valuable materials by cheaper waste products (such as for example in the manner disclosed by German Patents Nos. 44063, 44534 and 136792). These attempts have shown that the nitrogenous products, and in particular those of animal origin, are the products which are chiefly valuable. (Cf. H. Koehler, "*Die Fabrikation des Russes und der Schwärzen aus Abfällen und Nebenprodukten mit besonderer Berücksichtigung der Entfärbungskohlen*," Brunswick, 1912, p. 171, section 4, and p. 170, section 4).

Moreover, the said products are rendered still more expensive for the reason that the alkalis employed are converted, during the heating operation, either entirely or partially into cyanid of alkali; the production of which is no longer considered as paying the cost; *e. g.* the manufacture of ferrocyanid of potassium as carried on formerly.

According to my improved process, I obtain a decolorizing charcoal which, as regards decolorizing power and purity, will comply with any demand that may be made both in a technological and scientific respect, and which, in point of cost, will be equal to the cheapest commercial charcoal, such as animal black and charcoal, brought upon the market.

A feature of the present process resides in the fact that the waste liquor from the sulfite cellulose treatment is heated to a bright red heat in a concentrated or dry state in the presence of alkaline carbonates and with complete exclusion of air. The gases evolved are removed during the heating operation in order to prevent an increase of pressure. The gases may be condensed in the customary manner and worked up into wood-tar or wood-vinegar, while the noncondensable portion thereof is conveyed into the furnace.

The manner of operation hereinbefore described gives rise to a number of drawbacks due to the presence of sulfurous acid, which is contained in the waste liquor from the sulfite cellulose treatment partly in a free state and partly combined with lime. Thus, for example, by means of the sulfurous acid, the alkaline carbonate is converted into alkaline sulfite (in a proportion corresponding to the presence of free and partially combined acid) which may cause corrosion of the metal lining of the burning house during the heating operation, by giving rise to the formation of sulfids of iron. In addition the red hot charcoal will reduce the alkaline sulfites to sulfids, which is obviously tantamount to a loss in the final product. It has furthermore been found that the said drawbacks may be obviated by neutralizing the free and partially combined sulfurous acid contained in the waste liquor by means of a hydrate or carbonate of an alkaline earth. However, in this case, it is necessary that besides the quantity of the hydrate or carbonate of an alkaline earth required for neutralizing the sulfurous acid, there be made a still further addition of an alkaline earth carbonate, or of magnesium. It is only in consequence of this supplemental addition of an alkaline earth carbonate that decomposition of calcium sulfite during the heating operation is prevented. During this operation, the temperature of the burning house must by no means exceed that of the melting point of the mass. When the heating operation has been terminated, the charcoal must be separated from the alkaline earth carbonate and, for the purpose of removing the calcium compounds, the charcoal may be treated with muriatic or sulfurous acid, and then dried in the usual manner.

In the event of the calcium compounds proving an impediment to the attainment of the purpose for which the charcoal is to be used, and in order to make any subsequent extraction by means of acid unnecessary, the process may be modified so that the calcium sulfite contained in the waste liquor from the sulfite cellulose treatment is removed before the solution of alkaline carbonate is added.

This will, however, not be accomplished by simply filtering the waste liquor which has been neutralized by means of a hydrate or carbonate of an alkaline earth, because the alkaline earth sulfite which has been formed, will not separate out to a sufficient degree in consequence of the protective colloidal action of the waste liquor. On the other hand, experiments have shown that the alkaline earth sulfite may be removed from the waste liquor if the latter is intimately mixed with a large excess of alkaline earth carbonate and then, while the mixture is vigorously stirred, evaporate the same until a high degree of concentration has been attained. This operation will be accelerated provided the free and partially combined sulfurous acid has been almost entirely neutralized by means of an alkaline earth hydrate before the addition of the alkaline earth carbonate.

If it be desired to obtain a decolorizing charcoal which for all practical purposes will be free from ash, then the waste liquor, after having been mixed with alkaline earth carbonate, is evaporated, until a dry residuum has been obtained, and thereupon lixiviated with water, or a solution of alkaline carbonate derived from the lixiviation product of the preceding operation, and then filtered. The remaining steps in the process are identical with the method previously indicated, except that no extraction by means of acid is necessary. According to my improved process there is obtained a yield corresponding to from twenty-four to twenty-eight per cent. of the evaporated (i. e. free from carbonate) sulfite cellulose liquor; a yield equal to that of charcoal obtained on burning air-dried wood in kilns.

As the formation of cyanid of alkali from the alkaline carbonate is prevented, this last-mentioned valuable substance may always be reintroduced after the lixiviation operation and thus is rendered available for subsequent operations. As has already been mentioned, it accordingly becomes necessary to prevent any admission of air during the heating process; since the red hot alkaline carbonate will take up the nitrogen of the air, thus giving rise to the formation of cyanid.

If the heating operation has been properly carried out there will be no trace of cyanid present.

Furthermore, only a trace of sulfid of iron and small quantities, for instance 0.2 to 0.8%, of alkaline sulfid will be present. These two substances may be easily removed by carbonization with an alkaline carbonate.

The method of manufacture will be best explained by the following examples:

*Example I.*

4000 kilograms of the waste liquor from the sulfite cellulose treatment are mixed with 400 kilograms of potassium carbonate, 38 kilograms of oxid of calcium and 60 kilograms of ground, unburnt lime, and then evaporated. The dry mass is thereupon placed in an iron vessel resting within a muffle heated to a red heat. After complete gasification has been effected, the charcoal-containing material is thoroughly liviviated, for example in a Shank's apparatus, and is then washed out in a centrifugal or filter press and after, if necessary, having been extracted by means of acid, is finally dried and ground. The solution of potassium carbonate (of a density of about 25° Bé.) which flows out of the apparatus, is heated with about 30 kilograms of bicarbonate of potash, then clarified and evaporated up to a density of 50° Bé. The solution of potassium carbonate drawn off from the slight residuum of sulfate of potassium, is added to the 4000 kilograms of waste liquor from the sulfite cellulose treatment to be next worked up. The final product obtained amounts to 100 kilograms of a highly active decolorizing charcoal.

*Example II.*

4000 kilograms of waste liquor are mixed with 38 kilograms of oxid of calcium and 100 kilograms of unburnt lime and are then evaporated until a dry residuum has been obtained. The brittle substance is lixiviated with 645 liters of a solution of potassium carbonate of a density of 45° Bé. (derived from the previous operation) through a filter cloth, and the resulting liquor, which has a density of about 50 to 52° Bé., is drawn into the interior of the retorts, which are heated to a bright red heat, by means of siphons mounted within these latter. The subsequent steps of the process are identical with those set forth in Example I, except that there does not take place any extraction by means of acids.

What I claim is:

1. The process for the production of a highly active decolorizing charcoal which comprises, neutralizing the waste liquor from the sulfite cellulose treatment with an alkaline earth base, evaporating with an alkaline carbonate to dryness, and heating to a red heat.

2. The process for the production of a highly active decolorizing charcoal which comprises, neutralizing the waste liquor from the sulfite cellulose treatment with an alkaline earth carbonate, evaporating with an alkaline carbonate to dryness, and heating to a red heat.

3. The process for the production of a highly active decolorizing charcoal which comprises, neutralizing the waste liquor from the sulfite cellulose treatment with calcium carbonate and calcium oxid, evaporating with an excess of potassium carbonate to dryness, and heating to a red heat.

4. The process for the production of a highly active decolorizing charcoal which comprises, neutralizing the waste liquor from the sulfite cellulose treatment with calcium carbonate and calcium oxide, evaporating with an excess of potassium carbonate to dryness, and heating to a red heat with exclusion of air.

Signed by me at Vienna, in the Empire of Austria this 18th day of September, 1916.

ARTHUR KNÖPFLMACHER.

Witnesses:
RUDOLPH ADLER,
ARTHUR SINDENSTAD.